(12) United States Patent
Joguet et al.

(10) Patent No.: US 8,166,075 B2
(45) Date of Patent: Apr. 24, 2012

(54) METHOD FOR MAPPING AN X500 DATA MODEL ONTO A RELATIONAL DATABASE

(75) Inventors: Francois Joguet, Trevou-Treguignec (FR); Guy Jaffret, Pleumeur Bodou (FR)

(73) Assignee: Alcatel Lucent, Paris (FR)

( * ) Notice: Subject to any disclaimer, the term of this patent is extended or adjusted under 35 U.S.C. 154(b) by 280 days.

(21) Appl. No.: 12/455,452

(22) Filed: Jun. 2, 2009

(65) Prior Publication Data

US 2009/0300062 A1 Dec. 3, 2009

(30) Foreign Application Priority Data

Jun. 3, 2008 (EP) ................................. 08305224

(51) Int. Cl.
*G06F 17/30* (2006.01)
(52) U.S. Cl. ........................................... 707/802
(58) Field of Classification Search ............... 707/705, 707/736, 763, 781, 791–793, 795–797, 802, 707/803, 808, 809, 810
See application file for complete search history.

(56) References Cited

U.S. PATENT DOCUMENTS

| 5,291,583 | A | | 3/1994 | Bapat | |
|---|---|---|---|---|---|
| 6,016,499 | A | * | 1/2000 | Ferguson | 1/1 |
| 6,052,681 | A | * | 4/2000 | Harvey | 1/1 |
| 7,315,860 | B1 | * | 1/2008 | Harvey | 1/1 |
| 7,685,142 | B2 | * | 3/2010 | Harvey | 707/999.101 |
| 2004/0167866 | A1 | * | 8/2004 | Kaw et al. | 707/1 |
| 2008/0253402 | A1 | * | 10/2008 | Prudden | 370/485 |
| 2008/0253403 | A1 | * | 10/2008 | Bondy | 370/485 |
| 2008/0256020 | A1 | * | 10/2008 | Wakefield | 707/1 |
| 2008/0256082 | A1 | * | 10/2008 | Davies et al. | 707/10 |
| 2008/0256083 | A1 | * | 10/2008 | Wakefield | 707/10 |
| 2008/0256095 | A1 | * | 10/2008 | Wakefield | 707/100 |
| 2008/0256112 | A1 | * | 10/2008 | Prudden | 707/102 |
| 2008/0256142 | A1 | * | 10/2008 | Wakefield | 707/203 |
| 2008/0256250 | A1 | * | 10/2008 | Wakefield | 709/229 |

FOREIGN PATENT DOCUMENTS

EP 0 131 039 A 1/1985

OTHER PUBLICATIONS

David et al, "The performance of SQL queries to an X.500 directory system", Nov. 1995, Dept. of computing and information science Queen's University at Kingston, 28 pages.*
David et al, "An SQL interface to x.500" Nov. 1995, Dept. of computing and information science Queen's University at Kingston, 14 pages.*

(Continued)

*Primary Examiner* — Cam-Linh Nguyen
(74) *Attorney, Agent, or Firm* — Carmen Patti Law Group, LLC

(57) ABSTRACT

A method for mapping an X500 data model onto a relational database (RDB) comprises the steps of building object classes, each comprising a list of its attributes, building attributes, each comprising its type, building a static directory information tree (SDIT), comprising only static distinguished names (SDN) which are relative distinguished names (RDN) with variable values removed and mapping X500 data to the RDB by associating an X500 object class to an RDB table and associating an X500 attribute to an RDB table column and storing the name of the table column with the S500 attribute as an address pointing to the attribute.

7 Claims, 10 Drawing Sheets

OTHER PUBLICATIONS

Kolotyluk, Eric; Using X.500 to Facilitate the Creation of Information Systems Federations; MS Degree Thesis, Simon Fraser University, [online]; Dec. 1994; XP002497282; Burnaby, Canada.

Kille S.E.; Mapping the Global Naming Tree onto a Relational Database; Computer Message Systems—85; Proceedings of the IFIP TC 6 International Symposium North-Holland Amsterdam, Netherlands; 1986; pp. 105-114; XP008096861; Elsevier Science Publishers B.V. North Holland.

Perruchoud, F. et al; A Relational Data Base Design for an X.500 Directory System Agent; Message Handling Systems and Application Layer Communication Protocols; Amsterdam, NL, Jan. 1, 1991; pp. 405-418; Elsevier Science Publishers B.V. North Holland.

Hunt, Ray; CCITT X.500 Directories—Principles and Applications; Computer Communications, Elsevier Science Publishers BV, Amsterdam, Netherlands; vol. 15, No. 10; Dec. 1, 1992; pp. 636-645.

* cited by examiner

AUTHOR 12

| au_id | au_lname | au_fname | address | city | state |
|---|---|---|---|---|---|
| 172-32-1176 | White | Johnson | 10932 Bigge Rd. | Menlo Park | CA |
| 213-46-8915 | Green | Marjorie | 309 63rd St. #411 | Oakland | CA |
| 238-95-7766 | Carson | Cheryl | 589 Darwin Ln. | Berkeley | CA |
| 267-41-2394 | O'leary | Michael | 22 Cleveland Av. #14 | San Jose | CA |
| 274-80-9391 | Straight | Dean | 5420 College Av. | Oakland | CA |
| 341-22-1782 | Smith | Meander | 10 Mississippi Dr. | Lawrence | KS |
| 409-56-7008 | Bennet | Abraham | 6223 Bateman St. | Berkley | CA |
| 427-17-2319 | Dull | Ann | 3410 Blonde St. | Palo Alto | CA |
| 472-27-2349 | Gringlesby | Burt | PO Box 792 | Covelo | CA |
| 486-29-1786 | Locksley | Charlene | 18 Broadway Av. | San Francisco | CA |

TITLE

| title_id | title | type | price | pub_id |
|---|---|---|---|---|
| BU1032 | The Busy Executive's Database Guide | business | 19.99 | 1389 |
| BU1111 | Cooking with Computers | business | 11.95 | 1389 |
| BU2075 | You Can Combat Computer Stress! | business | 2.99 | 736 |
| BU7832 | Straight Talk About Computers | business | 19.99 | 1389 |
| MC2222 | Silicon Valley Gastronomic Treats | mod_cook | 19.99 | 877 |
| MC3021 | The Gourmet Microwave | mod_cook | 2.99 | 877 |
| MC3026 | The Psychology of Computer Cooking | UNDECIDED |  | 877 |
| PC1035 | But Is It User Friendly ? | popular_comp | 22.95 | 1389 |
| PC8888 | Secrets of Silicon Valley | popular_comp | 20 | 1389 |
| PC9999 | Net Etiquette | popular_comp |  | 1389 |
| PS2091 | Is Anger the Enemy ? | psychology | 10.95 | 736 |

PUBLISHER

| pub_id | pub_name | city |
|---|---|---|
| 736 | New Moon Books | Boston |
| 877 | Binnet & Hardly | Washington |
| 1389 | Algodata Infosystems | Berkeley |
| 1622 | Five Lakes Publishing | Chicago |
| 1756 | Ramona Publishers | Dallas |
| 9901 | GGG&G | München |
| 9952 | Scootney Books | New York |
| 9999 | Lucerne Publishing | Paris |

AUTHOR_TITLE

| au_id | title_id |
|---|---|
| 172-32-1176 | PS3333 |
| 213-46-8915 | BU1032 |
| 213-46-8915 | BU2075 |
| 238-95-7766 | PC1035 |
| 267-41-2394 | BU1111 |
| 267-41-2394 | TC7777 |
| 274-80-9391 | BU7832 |
| 409-56-7008 | BU1032 |
| 427-17-2319 | PC8888 |
| 472-27-2349 | TC7777 |

*FIG. 6*

```xml
<Entry name="SchemaRoot">
  <RDN="OU=BookshopOnLine"/>
</Entry>

<Entry name="AuthorRoot">
  <ParentRDN="OU=BookshopOnLine">
  <RDN="OU=Authors">
</Entry>

<Entry name="Author">
  <ParentRDN="OU=Authors">
  <RDN="AuthorId">
  <ObjectClass name="AuthorIdentity">
    <Attribute name="name" type=String/>
    <Attribute name="address" type=String/>
  </ObjectClass>
</Entry>

<Entry name="Work">
  <ParentRDN="AuthorId">
  <RDN="OU=WrittenBooks">
</Entry>

<Entry name="Book">
  <ParentRDN="OU=WrittenBooks">
  <RDN="ISBN">
  <ObjectClass name="BookDescription">
    <Attribute name="title" type=String/>
    <Attribute name="publisherId" type=Integer/>
  </ObjectClass>
</Entry>

<Entry name="PublisherRoot">
  <ParentRDN="OU=BookshopOnLine"/>
  <RDN="OU=Publishers"/>
</Entry>

<Entry name="Publisher">
  <ParentRDN="OU=Publishers"/>
  <RDN="PublisherId"/>
  <ObjectClass name="PublisherDescription">
    <Attribute name="publisherName" type=String/>
    <Attribute name="city" type=String/>
  </ObjectClass>
</Entry>

<Entry name="ClientRoot">
  <ParentRDN="OU=BookshopOnLine">
  <RDN="OU=Clients"/>
</Entry>

<Entry name="Client">
  <ParentRDN="OU=Clients"/>
  <RDN="ClientId"/>
  <ObjectClass name="ClientIdentity">
    <Attribute name="name" type=String/>
    <Attribute name="email" type=String/>
  </ObjectClass>
</Entry>

<Entry name="Orders">
  <ParentRDN="ClientId"/>
  <RDN="OU=Orders"/>
</Entry>

<Entry name="Orders">
  <ParentRDN="ClientId"/>
  <RDN="OU=Orders"/>
</Entry>

<Entry name="Order">
  <ParentRDN="OU=Orders"/>
  <RDN="Order"/>
  <ObjectClass name="OrderDescription">
    <Attribute name="title" type=String/>
    <Attribute name="price" type=Integer/>
  </ObjectClass>
  <ObjectClass name="OrderStatus">
    <Attribute name="received" type=Date/>
    <Attribute name="delivery" type=Date/>
    <Attribute name="delivered" type=Boolean/>
  </ObjectClass>
</Entry>
```

*FIG. 8*

Comment : this file is parsed by the mapping layer X500/RDB

Co mment : this section declare the "Static Dn" and for each, the ObjectClasses it contain StaticDn="AuthorId,OU=Authors,OU=BookshopOnLine" ObjectClasses="AuthorIdentity"
StaticDn="ISBN,OU=WrittenBooks,AuthorId,OU=Authors,OU=BookshopOnLine"
ObjectClasses="BookDescription"
StaticDn="PublisherId,OU=Publishers,OU=BookshopOnLine"
ObjectClasses="PublisherDescription"
StaticDn="ClientId,OU=Clients,OU=BookshopOnLine" ObjectClasses="ClientIdentity"
StaticDn="OrderNumber,OU=Orders,ClientId,OU=Clients,OU=BookshopOnLine"
ObjectClasses="OrderDescription,OrderStatus"

Comment : this section declare the "Object Classes" and for each, the list of attributes it contain ObjectClass="AuthorIdentity"         Attributes="name,country"
ObjectClass="BookDescription"        Attributes="title,publisherId" "
ObjectClass="PublisherDescription"   Attributes="publisherName,city"
ObjectClass="ClientIdentity"         Attributes="name,email"
ObjectClass="OrderDescription" Attributes="title,price"
ObjectClass="OrderStatus"   Attributes="received,delivery,delivered"

Comment : this section declare the Attributes and for each, it give its type and its mapping in the database Attribute="AuthorIdentity.name" Type="String(16)" Table="AuthorIdentity"
Column="name"
Attribute="AuthorIdentity.country" Type="String(16)" Table="AuthorIdentity"
Column="country"
Attribute="BookDescription.title" Type="String(64)" Table="BookDescription"
Column="title"
Attribute="BookDescription.publisherId" Type="Integer" Table="BookDescription"
Column="publisherId"
Attribute="PublisherDescription.publisherName" Type="String(16)"
Table="PublisherDescription" Column="publisherName"
Attribute="PublisherDescription.city" Type="String(16)"
Table="PublisherDescription" Column="city"
Attribute="ClientIdentity.name" Type="String(16)" Table="ClientIdentity"
Column="name"
Attribute="ClientIdentity.email" Type="String(16)" Table="ClientIdentity"
Column="email"
Attribute="OrderDescription.title" Type="String(64)" Table=OrderDescription""
Column="title"
Attribute="OrderDescription.price" Type="Integer" Table="OrderDescription"
Column="price"
Attribute="OrderStatus.received" Type="Date" Table="OrderStatus"
Column="received"
Attribute="OrderStatus.delivery" Type="Date" Table="OrderStatus"
Column="delivery"
Attribute="OrderStatus.delivered" Type="Boolean" Table="OrderStatus"
Column="delivered"

*FIG. 9*

```
create table AuthorIdentity (
            AuthorId CHAR[16] NOT NULL,
            name CHAR[16],
            country CHAR[16],
PRIMARY KEY (AuthorId) );

create table BookDescription (
            AuthorId CHAR[16] NOT NULL,
            ISBN INTEGER NOT NULL,
            title CHAR[64],
            publisherId INTEGER,
PRIMARY KEY (AuthorId, ISBN) );

create table PublisherDescription (
            PublisherId INTEGER NOT NULL,
            publisherName CHAR[16],
            city CHAR[16],
PRIMARY KEY (PublisherId) );

create table ClientIdentity (
            ClientId CHAR[16] NOT NULL,
            name CHAR[16],
            email CHAR[16],
PRIMARY KEY (ClientId) );

create table OrderDescription (
            ClientId CHAR[16] NOT NULL,
            OrderNumber INTEGER NOT NULL,
            title CHAR[64],
            price INTEGER,
PRIMARY KEY (C lientId, OrderNumber) );

create table OrderStatus (
            ClientId CHAR[16] NOT NULL,
            OrderNumber INTEGER NOT NULL,
            received DATE,
            delivery DATE,
            delivered BOOLEAN
PRIMARY KEY (ClientId, OrderNumber) );
```

*FIG. 10* createEntry AuthorId=BALZAC,OU=Authors,OU=BookshopOnLine
setAttribute AuthorId=BALZAC,OU=Authors,OU=BookshopOnLine name="Honore de Balzac"
setAttribute AuthorId=BALZAC,OU=Authors,OU=BookshopOnLine country="FRANCE"

createEntry AuthorId=HEMINGWAY,OU=Authors, OU=BookshopOnLine
setAttribute AuthorId=HEMINGWAY,OU=Authors,OU=BookshopOnLine name="Ernest Hemingway"
setAttribute AuthorId=HEMINGWAY,OU=Authors,OU=BookshopOnLine country="US"

createEntry
ISBN=10000,OU=WrittenBooks,AuthorId=HEMINGWAY,OU=Authors,OU=Book shopOnLine
setAttribute
ISBN=10000,OU=WrittenBooks,AuthorId=HEMINGWAY,OU=Authors,OU=BookshopOnLine
title="The Old Man And The Sea"
setAttribute
ISBN=10000,OU=WrittenBooks,AuthorId=HEMINGWAY,OU=Authors,OU=BookshopOnLine
publisherId="453"

createEntry
ISBN =20000,OU=WrittenBooks,AuthorId=BALZAC,OU=Authors,OU=BookshopOnLine
setAttribute
ISBN=20000,OU=WrittenBooks,AuthorId=BALZAC,OU=Authors,OU=BookshopOnLine
title="Le rouge et le noir"
setAttribute
ISBN=20000,OU=WrittenBooks,AuthorId=BALZAC,OU=Authors,OU=BookshopOnLine
publisherId="321"

createEntry PublisherId=321,OU=Publishers,OU=BookshopOnLine"
setAttribute PublisherId=321,OU=Publishers,OU=BookshopOnLine"
publisherName="Folio"
setAttribute PublisherId=321,OU=Publishers,OU=BookshopOnLine" city="Paris"

createEntry PublisherId=453,OU=Publishers,OU=BookshopOnLine"
setAttribute PublisherId=453,OU=Publishers,OU=BookshopOnLine"
publisherName="Casterman"
setAttribute PublisherId=453,OU=Publishers,OU=BookshopOnLine" city="Lyon"

createEntry "ClientId=3478,OU=Clients,OU=BookshopOnLine"
setAttribute "ClientId=3478,OU=Clients,OU=BookshopOnLine" name="Jean Dupont"
setAttribute "ClientId=3478,OU=Clients,OU=BookshopOnLine"
email="jean.dupont@email.fr"

createEntry
"OrderNumber=0086,OU=Orders,ClientId=3478,OU=Clients,OU=BookshopOnLine"
setAttribute
"OrderNumber=0086,OU=Orders,ClientId=3478,OU=Clients,OU=BookshopOnLine"
title="The Old Man And The Sea"
setAttribute
"OrderNumber=0086,OU=Orders,ClientId=3478,OU=Clients,OU=BookshopOnLine"
price="15"
setAttribute
"OrderNumber=0086,OU=Orders,ClientId=3478,OU=Clients,OU=BookshopOnLine"
received=2008.05.01
setAttribute
"OrderNumber=0086,OU=Orders,ClientId=3478,OU=Clients,OU=BookshopOnLine"
delivery=2008.05.08
setAttribute
"OrderNumber=0086,OU=Orders,ClientId=3478,OU=Clients,OU=BookshopOnLine"
delivered=true

*FIG. 11* readEntry AuthorId=BALZAC,OU=Authors,OU=BookshopOnLine

> AuthorId=BALZAC,OU=Authors,OU=BookshopOnLine
> name="Honoré de Balzac"
> country="FRANCE"

FIG. 12 listEntry ISBN=*,OU=WrittenBooks,AuthorId=*,OU=Authors,OU=BookshopOnLine

> ISBN=10000,OU=WrittenBooks,AuthorId= HEMINGWAY,OU=Authors,OU=BookshopOnLine
> name="Ernest Hemingway"
> country="US"

> ISBN=20000,OU=WrittenBooks,AuthorId=BALZAC,OU=Authors,OU=BookshopOnLine
> name="Honoré de Balzac"

> country="FRANCE"

FIG. 13

METHOD FOR MAPPING AN X500 DATA MODEL ONTO A RELATIONAL DATABASE

CROSS REFERENCE TO RELATED APPLICATIONS

This application claims priority of the European Patent Application serial No. 08305224.1 filed Jun. 3, 2008 which is incorporated by reference herein.

FIELD OF THE INVENTION

The technical domain of the invention is the domain of database. Databases are known to collect and organize data in a practical way in order to store, modify, retrieve and analyse them.

BACKGROUND

Several paradigms of database organisation are known. Data are provided in the form of objects, each object being a piece of data, and gathering a plurality of attributes relative to said object, each attribute containing a name or type and a value.

One of the most used paradigms is relational database, RDB. In relational database, data are stored in tables, also named relations. The names of the columns being the names of the attributes, each object corresponds to a row in a table, said row containing the values of the corresponding attributes.

Relational database are well known for a long time. They have proven to be a powerful way of storing data. They are very used all over the world, and a lot of tools and systems are available to manage such databases. Also a lot of practitioners are educated to create, manage or use such databases and associated tools. For example, the SQL query language is well known and used.

However, the relational paradigm appears to be somewhat limited when dealing with complex organizations of data, and new paradigms have been developed to provide tools with more elaborated semantic to express said complexity. X500 is one of these alternative paradigms that tend to meet the favour of database owners and users. X500 allows a richer syntax when describing the organization of a database. X500 is standardized. X500 provides a more user friendly approach that allows the manager of a database to easily describe the structure of its data. It is also possible to design an X500 specification using the know language UML.

Both RDB and X500 worlds have their own advantages, and it would be advantageous to take benefit from the two worlds. It is then of interest to be able to provide a mapping of an X500 data model to a relational database model.

Other constraints, coming from the fact that the solution, bound to be used by telecom applications that need time performances and that work on big amount of data, are the ability to provide performances equivalent to the direct RDB use, and the optimization, as most as possible, of the whole database size.

WO96/07147 (U.S. Pat. No. 6,052,681) describes a solution to this problem. However, X500 information is integrated into the RDB tables. This causes a big overhead on database size. Furthermore one X500 access triggers many database access and thus degrades performances.

In US 2006/0173873 a hierarchical/relational translation system is described which uses virtual directory services.

In U.S. Pat. No. 6,823,338 a method for mapping X500 access control data to a relational data base is described.

In U.S. Pat. No. 5,333,317 a method of searching in an X500 database is described.

However none of these methods satisfies all of the given constraints.

SUMMARY

The present invention addresses and solves this problem by providing an X500 model view of a RDB. Based on an underlying RDB that manages the data objects, is provided a mapping interface that shows the objects to a user, as if they were organized according to an X500 model. The user accesses the objects and manages them as if they were X500 objects. The mapping system then provides all the necessary actions to interface with the RDB management system in a transparent way.

The main and original idea of the invention is to use or create a standard relational database to store the data and to have, stored apart, information relative to the X500 model's structure. So doing, the database is not amended or affected by the mapping method and the size of the database depends only on useful data size. Moreover information related to mapping X500 model with relational database model is provided that describes relations between X500 entities and relation database schema and data.

The object of the invention is a method, in a computer system, for mapping an X500 data model comprising at least one entry, at least one object class, and a directory information tree, DIT, an entry comprising at least one attribute, an attribute comprising a type and a value, said entry gathering information about one object, an object class being a model defining the types of said attributes present in the entry that describes said object, the vertices in said DIT, being entries, each entry comprising a distinguished name, DN, comprising the DN of said parent's entry in said DIT together with a relative distinguished name, RDN, comprising one specially nominated attribute proper to said entry, onto a relational database, RDB, comprising relational tables, each table comprising several named columns, some of these columns being primary key, that is containing value that uniquely identify object data, where object data is stored in row, comprising the steps of:

building object classes, each comprising a list of its attributes, building attributes, each comprising its type, building a static directory information tree, SDIT, comprising only static DN, SDN, that is DN comprising only static RDN, that is RDN with any variable value removed, mapping X500 data to RDB by associating
an X500 object class to a RDB table,
an X500 attribute to a RDB table column and storing the name of said table column with said X500 attribute, as an address pointing to said attribute.

According to another feature of the invention, the steps of building object classes, building attributes, and building a static directory information tree, are made by respectively extracting said elements from an X500 specification.

According to another feature of the invention, the steps of building object classes, building attributes, and building a static directory information tree, are made by creating these elements out of an analysis of a RDB.

According to another feature of the invention, an access/request to an entry, respectively an attribute of an entry, of the X500 mapped RDB, defined by the DN of said entry, respectively by the DN of the entry of said attribute together with said attribute, comprises the steps of:

build a static DN, SDN, from said entry's DN, by removing any variable value out of said DN, fetch the static DIT, SDIT, to localize a matching static DN, extract from the attributes of said matching static DN the mapping addresses of the table columns corresponding to all of the attributes of said entry, respectively to said attribute, build a RDB request containing said mapping addresses, execute the request, get the result of said request.

BRIEF DESCRIPTION OF THE DRAWINGS

Others features, details and advantages of the invention will become more apparent from the detailed illustrating description given hereafter with respect to the drawings on which:

FIG. 6 is an example of an RDB,

FIG. 7-13 show an example of processing where:

FIG. 7 shows the X500 model,

FIG. 8 shows the XML code generated for the entries,

FIG. 9 shows the XML code for the mapping information,

FIG. 10 shows the XML code for the RDB tables creation,

FIG. 11 shows the XML code for creating entry for populating the database,

FIG. 12 shows a sample of a first query,

FIG. 13 shows a sample of a second query.

DETAILED DESCRIPTION

First, the features of an X500 model will be described. An X500 model is based on a directory information base, DIB. The DIB and its structure are defined in ITU-T Rec. X501-ISO/IEC 9594-2. In order to make the invention understandable, the main features of X500 are explained here after.

The DIB is made up of information about objects. It is composed of (Directory) entries, each of which consists of a collection of information on one object. Each entry is made up of attributes. Each attribute has a type and one value. The entries of the DIB are arranged in the form of a tree, the Directory Information Tree, DIT, where the vertices represent the entries. Entries higher in the tree (nearer the root) will often represent objects such as countries or organizations, while entries lower in the tree will represent people or application processes.

For example the entry {C=GB, L=Winslow, O=Graphic Services, CN=Laser Printer} identifies the application entity, "Laser Printer", which has the geographical attribute of Locality. Said entry is composed of four attributes. The first attribute C=GB indicating a type C with a value of GB with an '=' sign in between, informing on the C (for country) of the object.

Figure 3:
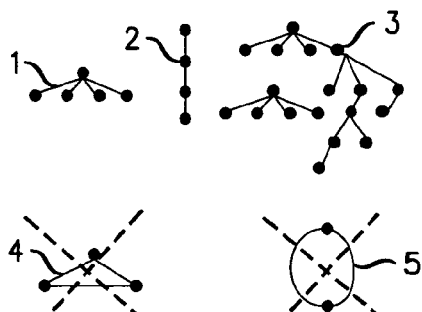
FIG. 3 shows examples of allowed/unallowed topologies.

FIG. 3 shows different topology for a DIT. A DIT must be tree structured as illustrated by the three upper schemes 1, 2, 3. The two lower schemes 4, 5, not tree structured, are not valid schemes for a DIT.

Figure 4:
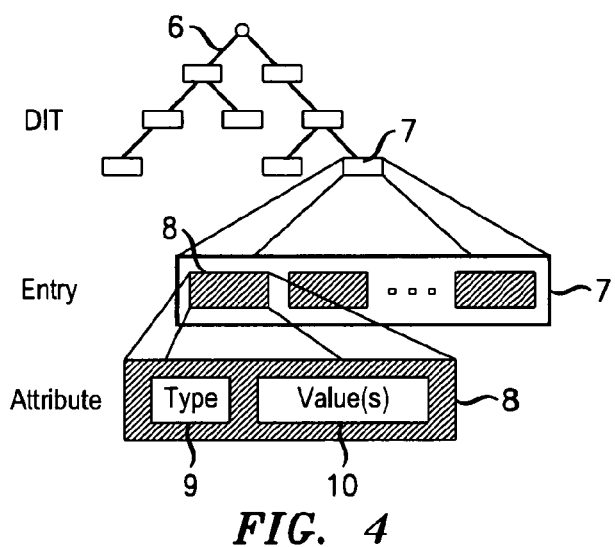
FIG. 4 shows the hierarchical organization of a X500 DIT.

FIG. 4 shows an example of a DIT 6 comprising numerous vertices/entries 7. An entry 7 is shown in details as comprising a plurality of attributes 8. An attribute 8 is further detailed to be composed of a couple Type 9/Value 10.

Every entry 7 has a distinguished name, DN, which uniquely and unambiguously identifies the entry 7. These properties of the distinguished name, DN, are derived from the tree structure of the information. The distinguished name, DN, of an entry 7 is made up of the distinguished name, DN, of its superior entry, together with specially nominated attribute values (the distinguished values) from the entry 7 also called the relative DN or RDN. The Distinguished Name, DN, also called address of an entry 7, provides the capability to instantiate (build) or analyse (extract) a DN starting from a given DN Description.

Figure 5:
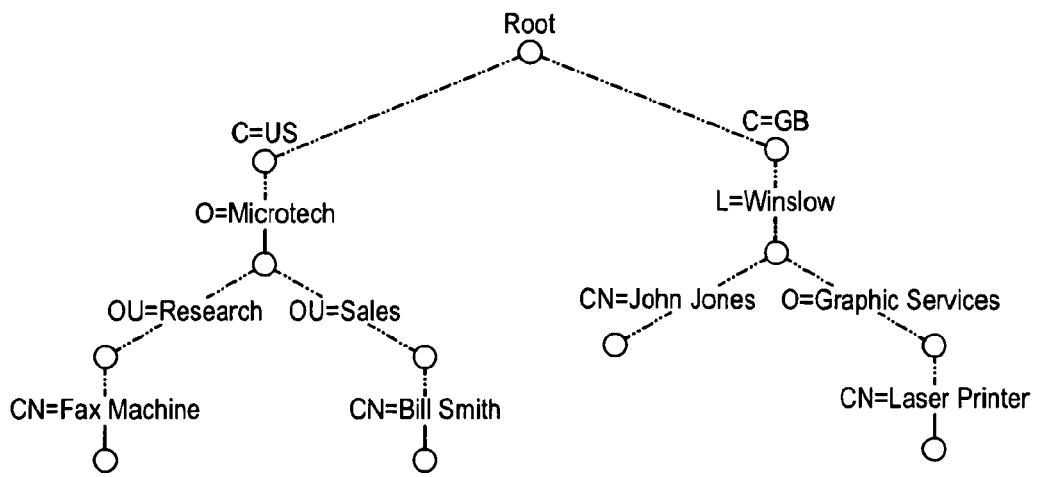
FIG. 5 is an example of a DIT.

FIG. 5 provides a example of a DIT 6. The illustrative entry {C=GB, L=Winslow, O=Graphic Services, CN=Laser Printer} is located at the lowest right leaf of the tree. The specially nominated attribute values of the entry is the attribute CN=Laser Printer. So the RDN is equal to CN=Laser Printer. While climbing up to the root of the tree, the DN of said entry may be built by appending the RDN of the successively superior entries. Then, one level up adds O=Graphic Services. One further level up adds L=Winslow. The last level to the root finally adds C=GB to provide the whole DN of said entry: {C=GB, L=Winslow, O=Graphic Services, CN=Laser Printer}, as the merging of all successive RDNs.

The Directory enforces a set of rules to ensure that the DIB remains well-formed in the face of modifications over time. These rules, known as the Directory schema, prevent entries having the wrong types of attributes for its object class, attribute values being of the wrong form for the attribute type, and even entries having subordinate entries of the wrong class.

The DIT 6 comprises all the structural and hierarchical information about the objects in the database. The DIT 6 is the addressing scheme of the database, that is the syntax of the DN or the DN description used to address an instance of an entry 7. In that addressing scheme lies the hierarchical organisation between entries 7.

An X500 model also comprises information about the types 9 of the attributes 8 that are present in a particular entry 7. These attribute's types are dependent on the class of object which the entry 7 describes. Object classes are models defining the types of said attributes present in a given entry 7. Object classes are defined to represent a logical grouping of attributes 8 that are functionally linked together, and to represent the logical constraints inside this group of attributes 8. The specification of object classes, given in addition to the DN defining the DIT, allows the building of entry 7. An entry 7 is an instantiation of one or more object classes, that is, a set of attributes 8 compliant with the application schema give by object classes.

As an example the lines below:

ObjectClass="AuthorIdentity" Attributes="name,country"

ObjectClass="BookDescription" Attributes="title,publisherId"

define two illustrative object classes. The first object class AuthorIdentity comprises two attributes: name and country. An instantiation of an author entry may advantageously use the object class AuthorIdentity. When dealing with the bibliography of said author, the object class BookDescription may be used to instantiate each of the books written by said author.

For example the name: {C=GB, L=Winslow, O=Graphic Services, CN=Laser Printer} identifies the application entity, "Laser Printer", which has in its distinguished name the geographical attribute of Locality. The residential person, John Jones, whose name is {C=GB, L=Winslow, CN=John Jones}, has the same geographical attribute in his distinguished name. The geographical attribute may then advantageously be a object class.

Figure 2:
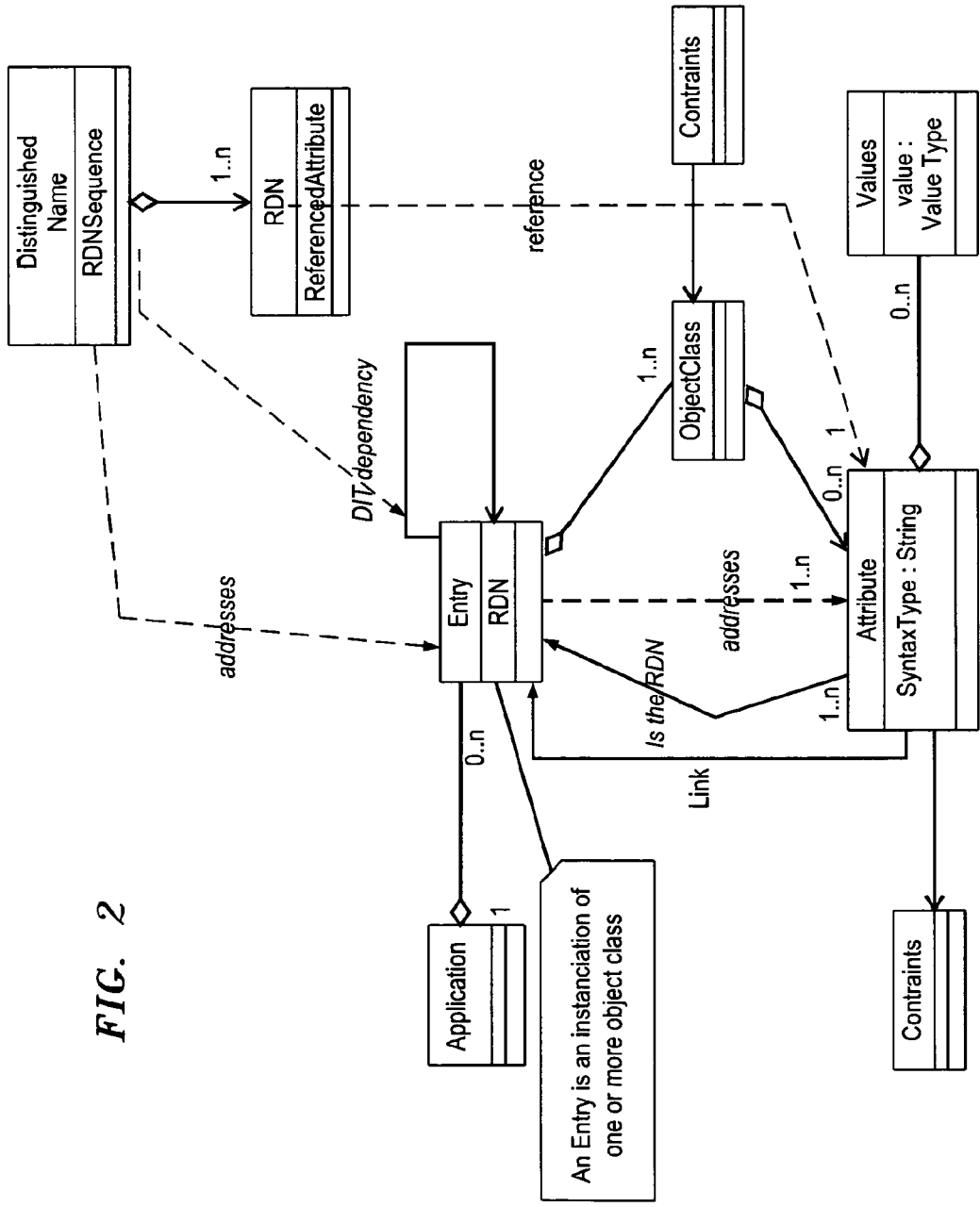
FIG. 2 is an UML view of the organization of a X500 model.

FIG. 2 provides an UML view of the organization of an X500 model, and the relations between the various entities.

The entities that can be addressed in X500 models are entries 7 and attributes 8 in the entries. Object classes are not addressable as such. They only represent a logical grouping of attributes that are functionally linked together, and the logical constraints (mandatory, optional,) inside this group of attributes 8.

Second, the features of a relational database, RDB, will be described. FIG. 6 show a sample of such a RDB. The Relation Database Model is based on the following basic concepts: data is presented as a collection of relations; each relation is depicted as a table 11; columns 14 are attributes depicted by their titles 13; and rows 15 represent objects. Every table 11 has a set of attributes 13 that taken together as a "key" uniquely identifies each object.

The sample of FIG. 6 shows a database organized as a RDB an and featuring four tables 11, depicted by their titles 12: Author, Title, Publisher and Author title. Objects are disposed in rows 15. For example, an object/row 15 of the Title table 11 comprises five attributes 13 indicated as the columns titles 13. The fourth row 15 of the Title table 11 has an attribute 13 of the type "title_id" whose value is BU7832." It also has a "title attribute, whose value is "Straight Talk About Computers", a "type" attribute, whose value is "business", a "price" attribute, whose value is "19.99", and a "pub_id" attribute, whose value is "1389."

Keys in relational data base have two purposes: quickly retrieve information from a database by choosing one or more column to act as keys, and eventually sort them by the key value. The database management system, DBMS, creates an index containing just the key field contents and the location of the corresponding rows 15, and maintain the structural integrity of the tables 11, helping to avoid problems such as duplicate records/objects and conflicting values in columns 13.

Among keys, a primary key uniquely identifies an object, or row 15 in a table 11. In a students table, for instance, a key built from last name+first name might not gives a unique identifier (two or more Jane Does in the school, for example). To uniquely identify each student, a special Student ID field may be added to be used as the primary key.

This is done is in the relational database example given at FIG. 6, with the au_id (author ID) as the primary key of the AUTHOR relation 11. In the example, as attempt to insert a new author with the Id 172-32-1176, would violate the design of the database since au_id is a primary key and there already is a customer 172-32-1176. The DBMS must reject such a transaction that would render the database inconsistent by a violation of an integrity constraint.

A foreign key is a key used in one table 11 to represent the value of a primary key in a related table. While primary keys must contain unique values, foreign keys may have duplicates. For instance, if we use student ID as the primary key in a Students table (each student has a unique ID), we could use student ID as a foreign key in a Courses table: as each student may do more than one course, the student ID field in the Courses table (often shortened to Courses.student ID) will hold duplicate values. Foreign keys are integrity constraints enforcing that the value of the attribute set is drawn from a candidate key in another relation. For example, in the Title relation 11 of the example of FIG. 6, the attribute pub_id is a foreign key that provides access to the publisher description in the Publisher relation.

It derives from the previous descriptions of the features of X500 and relational models, that RDB only offers relations/tables to structure the data, and thus provides a poorer syntax than a X500 model. When mapping an X500 model to a RDB database, one has to first, provides structural information about data, and second, mapping information of where objects are stored in the RDB, in what tables, with reference to X500 model addressing entities.

The DIT 6 is the static representation of the hierarchical organisation of X500 entries 7. It defines how the entries 7 must be organised in a hierarchical way. This hierarchical organisation is provided by the naming of each entry 7.

All the entries of an X500 data model are named by a Distinguish Name, DN. As an X500 data model is organised as a hierarchical tree of entries, the DIT 6, each entry 7 is named in the context of its parent entry. This name is called the Relative Distinguish Name, RDN, as it is relative to the parent of the entry 7. The DIT 6 is the static representation of the hierarchical organisation of X500 entries. It defines how the entries must be organised in a hierarchical way. The hierarchical Tree of an X500 data model has a common root.

The Distinguish Name, DN, of an entry 7 is composed of the sequence of RDN of the Entry 7 and all its successive parents up to the root of the hierarchical tree. The DNs uniquely identify each entry 7 of the X500 tree. From a DN of an entry 7, one can derive the DN of its containing entry, if any, and so on. This containment relation is the only relation carried by the DN. No other relation can be carried or implied by the DN. The DN may for instance be encoded using a string representation.

The most important restriction concerning the DN string representation is that a RDN cannot be a multi-valued Data.

Otherwise, the output consists of the string encoding of each RDN in the RDNSequence, starting with the first element of the sequence and moving forward toward the last element.

The RDN string representation consists of the string encoding of the singleton AttributeTypeAndValue as follows:

the AttributeTypeAndValue is encoded as the string representation of the AttributeType, followed by an equal character ('=', ASCII 61), followed by the string representation of the AttributeValue. The "," may be used as separator between RDNs. Spaces and period may be used as part of the legal character syntax for RDNs, as in the following example CN=John T. Mills, O=Cyber System Consulting, L=Göteborg, C=SE.

Figure 7:
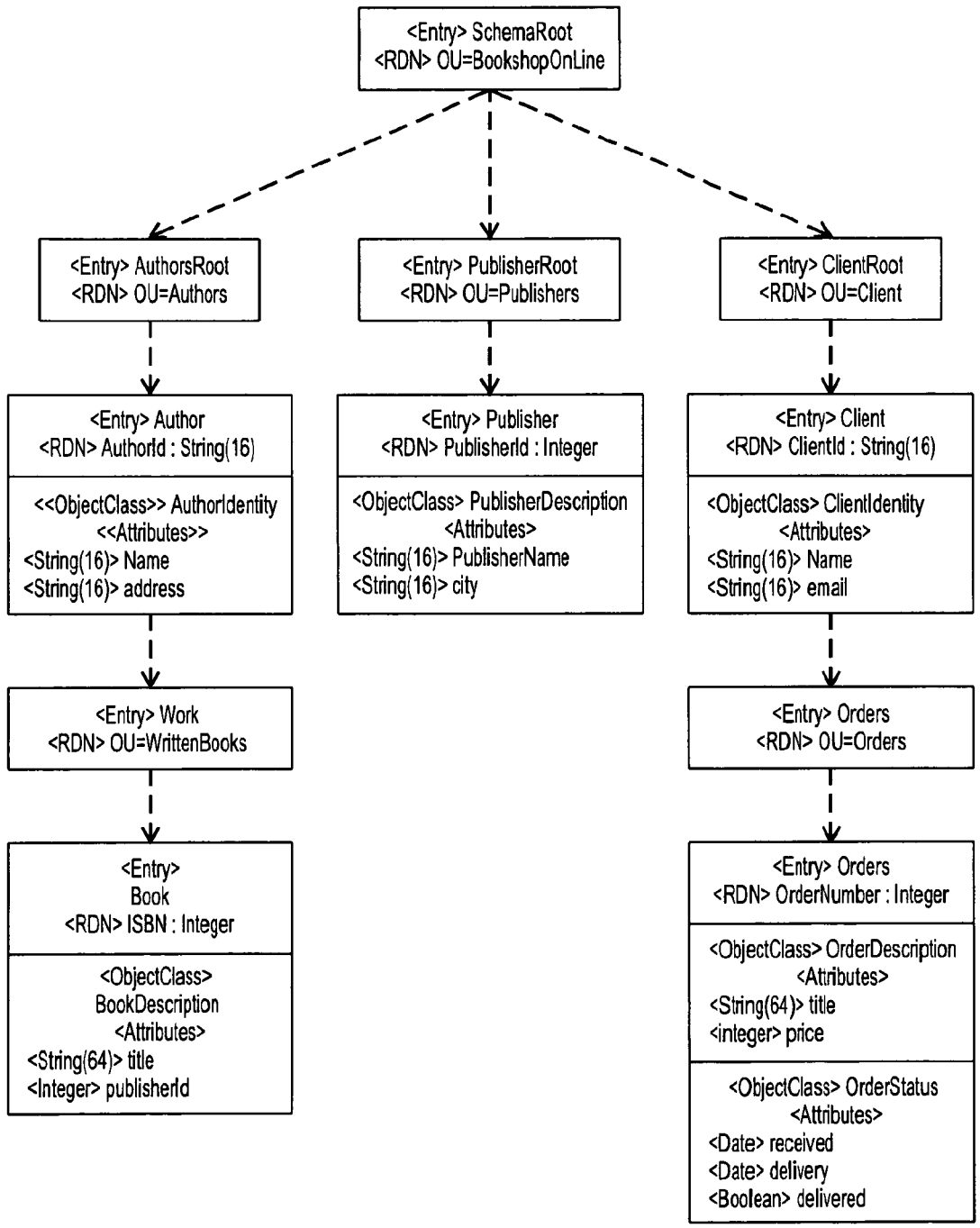

This allows to describe the tree structure of the DIT, by a list of DN, comprising a unique DN for each entry 7. This is a convenient representation for treatment. FIG. 7 comprises a sample listing of entry in the form of DNs, equivalent to a DIT 6. This example would be detailed later on.

A software application is in charge of the mapping between the X500 view and the Relational view. Said application extracts, and manage all the necessary information to map the X500 model onto the RDB.

This mapping encompasses the static mapping between the X500 view, and the relational schema, where:
  an X500 object class is mapped onto a RDB table,
  an X500 attribute is mapped onto a table column.

With respect to dynamic mapping, the loading of a data object, indicated by an entry or a DN, corresponds to the retrieval of the corresponding row/records in the corresponding table columns. When dealing with creating or updating or deleting entries or attributes, it correspond to respectively create or update or delete the corresponding rows/records in the corresponding tables.

For each entry in the X500 data model, we must know the list of relational database tables the entry is mapped to, as well as the corresponding object class mapping. We must know what columns the data of each object classes are mapped to.

We must also be able to deduce from the DN of the entry, the value of the key attributes to access all the tables this entry is mapped to.

All these mapping description are necessary to be able to map a request concerning a given entry onto the proper set of requests on the relational database tables.

In an X500 data model, each attribute defined in any object class must be mapped to the column name of a Relational Table in the relational data model.

Each object class defined in any entry must be mapped to a relational table in the relational data model.

A DN syntax, DNS, defines the structure of the DN used to address a given entry. The DN syntax is used by the software application, to find the corresponding tables on which the entry is mapped, and map the attribute in the received DN to the corresponding key attributes of these tables.

The DN syntax, DNS, is composed of a sequence of RDN descriptions (Relative Distinguished Name description), where each attribute of the RDN is mapped to a key attribute of a relational table when appropriate, i.e. when the RDN has a variable value/is variable.

One DN syntax, DNS, is associated to one and only one entry, and one entry uses one and only one DN Syntax to be addressed.

Each RDN description of the sequence should indicate: the name of the corresponding RDN attribute, if the RDN has a constant value, for example an organisation unit such as OU=CAMEL, the value of the constant.

Otherwise, and when appropriate, the description of the mapping to the different key attributes: the name of the column corresponding to the key attribute and if necessary according to the syntax or language used, the name of the table.

A RDN can be either:

```
<RDN attributeName="Name of a constant attribute: for
example "OU"">
    <VAL> value of the constant </VAL>
</RDN>
```
or,
```
<RDN attributeName="Name of the RDN attribute"
        columnName="Name of the corresponding key
        attribute of the table"/>
</RDN>
```

An example of DNDescription is provided below, based on the X500 and relational data model already defined as example:

```
<DNSyntax name="Author_DN">
    <RDN attributeName="authorId" columnName="au_id"/>
    <RDN attributeName="OU">
        <Val>BookshopOnLine</Val>
    </RDN>
</DNSyntax>
<DNSyntax name="Title_DN">
    <RDN attributeName="isbn" columnName="title_id"/>
    <RDN attributeName="OU">
        <Val>BookshopOnLine</Val>
    </RDN>
</DNSyntax>
<DNSyntax name="Publisher_DN">
```
-continued
```
    <RDN attributeName="publisherId" columnName="pub_id"/>
    <RDN attributeName="OU">
        <Val>BookshopOnLine</Val>
    </RDN>
</DNSyntax>
```

It then appears important to distinguish between constant RDN and variable RDN.

A RDN always corresponds to an attribute with a type, and a value. In a constant RDN, the value is a constant. In a variable RDN, the value is a variable. A constant RDN may, for instance, defines an OU or Organisation Unit. Such a constant RDN defines the hierarchical organisation of the entries and would appear in the DIT. A variable RDN instead, allows to instantiate entry and must be mapped to a table column in a RDB model.

Figure 1:
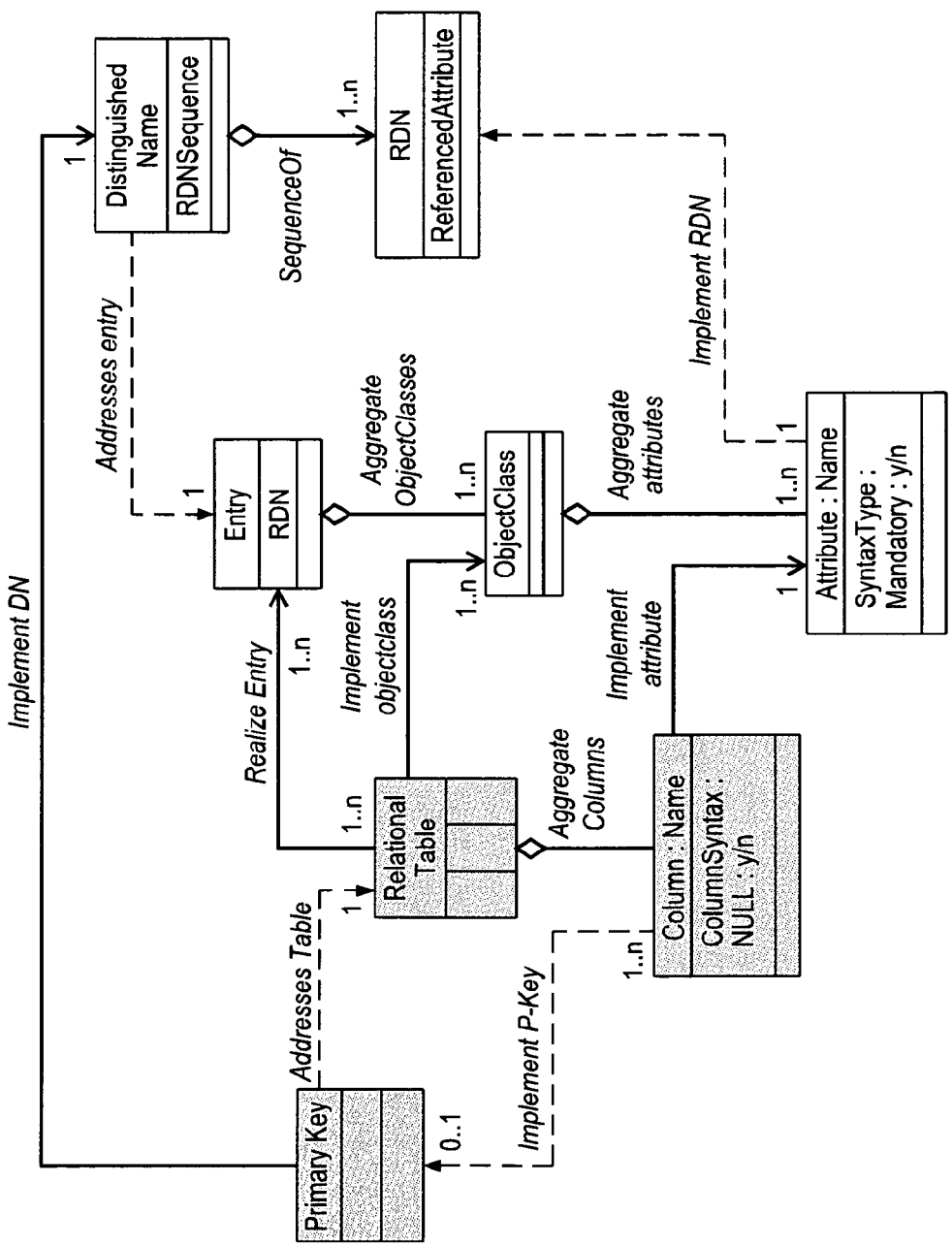
FIG. 1 is a UML view of the mapping method.

FIG. 1 provides an UML description of the mapping process and the interaction between all entities implied.

The method according to the invention comprises the steps of:
building object classes, each comprising a list of its attributes,
building attributes, each comprising its type,
building a static directory information tree, SDIT, comprising only static DN, SDN, that is DN comprising only static RDN, that is RDN with any variable value removed,
mapping X500 data to RDB by associating
an X500 object class to a RDB table
an X500 attribute to a RDB table column and storing the name of said table column with said X500 attribute, as an address pointing to said attribute.

The steps of building attributes and object class are important to capture the typology of the data. This is typically the features that are present in an X500 model and not in a RDB model.

Another point only present in an X500 model is the hierarchy of entry. This is comprised in the DIT 6 and disappears in the RDB view, where no equivalent can be found. One way to capture said hierarchy of entries is to keep the DIT 6. An important feature of the invention is that not the whole DIT is kept but only the part that is indicative of the hierarchy. Advantageously, all the variable parts of the DIT 6 may be torn apart in order to only keep a static directory information tree, SDIT. Such a SDIT only comprises static DN, SDN, that is DN comprising only static RDN, that is RDN with any variable value removed. After that removing, multiple identical static DN may appear, since different entries only differs by their values. Only one SDN of each is kept. This "statification" greatly reduces the size of the SDIT. The SDIT is also adapted to query the database as would be explained later. For instance the static DN corresponding to the DN of the previous example: {C=GB, L=Winslow, O=Graphic Services, CN=Laser Printer} would be {C=, L=, O=, CN=}, since the four RDN of this entry are variable ones.

Consequently the RDB that contains the data objects is "augmented" by typological information: object classes and attributes and by topological/hierarchical information: the static DIT. These information can be used to scan the database for a query.

Another information must be maintain by the mapping application that are the mapping addresses themselves. The X500 data are mapped to RDB by associating an X500 object class to a RDB table. This is important when it comes to implement the database itself as would be explained later. But the real link between the X500 data and the RDB data is maintained by mapping an X500 attribute to a RDB table column. This may be implemented by storing the name of said table column with said X500 attribute. Such a name may then be used as an address pointing to said attribute. Advantageously this may be store in the previously built attributes or even in the skeleton SDIT.

With all these elements defined, it is then possible to view and access the underlying RDB, via the mapping application, as an X500 database, and to link the elements of the two worlds by mean of mapping addresses.

To reach such a mapping application there may be two starting points depending of the history of the database.

The first starting point supposes an existing RDB already constructed and populated. To take advantage of the existent, the RDB is kept as is and an X500 model must be added to provide the X500 view to a user.

The second starting point, corresponding to claim 2, supposes no pre existing RDB, but an existing X500 organization of the data, and a will to use an RDB managing tool, but the RDB database is to be built and populated.

In the second point, the organization of the data is contained in an X500 model. Said model provides all the information: object classes, attributes, and a DIT or SDIT. These information need only to be extracted from said model. It is to be noticed that the DIT need not to be "populated" with the whole entry of the database, and a specification of the hierarchical organization may be given by the database creator directly in term of a static DIT. Either if the DIT is populated, that is it correspond to a populated X500 database, it can be first "statifyed".

Since the RDB does not pre exist, it is possible to tailor it to match the X500 organization and to ease the future mapping. Then a RDB table is created for each object class. The columns of this table being define by the list of its attributes. Then the mapping is done by creating table according to object classes and storing the table name and table column in the corresponding attributes.

The RDB can then be populated, either directly via a RDB direct access or via the mapping application with an X500 view. When starting from a populated DIT or X500 complete database, all data must be transferred in a known way.

In the first point, all starts from an existing RDB. The problem arises from the fact that the RDB contains quite no typological or hierarchical information. Two options are then offered to the manager.

The first option consists to automatically derive from the RDB the needed information, that is, object classes, attributes and SDIT. This can be done for instance by building an object class for each table, an attribute for each column of such a table, and a DIT. Since no hierarchical information can be found in RDB, it can not automatically be created. Then, no static RDB will be created and the SDIT will consist in a one level tree, comprising a root and with all the entry directly linked to said root.

The second option takes the opportunity of the mapping to augment the organization of the database. In that case the database manager may add some hierarchical level and create a SDIT with multiple added levels. Such an operation must be made manually by an operator that is aware of how organized the data should be. Since such information is not initially present it must be added and all the coherencies be checked.

Whatever the way they are obtained, we suppose from now that all the mapping information are available and that the mapping application is ready to operate. Such a mapping application is used the following way.

The aim is to access an object stored in the RDB while providing an X500 to the user. Said user willing to access a given entry provides, as parameter to his request, an entry or an attribute of an entry. To do that with an X500 view, he provides a DN. This DN is either the DN of said entry or the DN of the entry of said attribute, completed by the indication of said attribute. The request may then be a consulting (read) or modifying (create, modify or delete) request. All these requests are considered equally since the main purpose here is to explain the mapping, which remains the same. The request process, operated by said mapping application, comprises the following steps. A static DN, SDN, is built/extract from said given DN, by applying the same statification process as previously, that is by removing all variable value of said DN.

Said SDN is then compared to the SDN of the SDIT until it match one of the SDN of said SDIT. Given said matching SDN, the mapping application may refer to the object class corresponding to said SDN, and to the attribute(s) of said SDN, each variable RDN corresponding to one attribute. With each of said attribute is store the address (table and column) of said attribute in the RDB. In case of a request toward an attribute the single address is used. In case of an entry, the addresses of all the attribute of said entry are used.

Based on said addresses, the mapping application build a RDB request, using the RDB requesting language of the RDB managing tool. The request is submitted to said managing tool in order to get a result. Said result may then be presented to the user. A modify request would process quite the same way to get the data. Modification would then process using the same address mechanism to modify/update the RDB content.

In order to help understand the scope of the invention, and also to provide an applied use of the teaching of the invention, the several steps of the method are now applied to an example.

The example corresponds to a second starting point case. The RDB database does not pre exist. It concerns a books application. The database manager has designed a hierarchical tree in the form of the DIT of FIG. 7. Said specification of DIT is already static. Said DIT comprises, root included, eleven vertices/leaves, corresponding to eleven entry or eleven static DN: SchemaRoot, AuthorRoot, Author, Work, Book, PublisherRoot, Publisher, ClientRoot, Client, Orders, Order, OrderDescription, OrderStatus.

A textual representation, in an XML syntax, equivalent to said DIT of FIG. 7 is provided in the listing of FIG. 8. Each entry contains a RDN and a Parent RDN in order to textually capture the tree structure. As in the tree, the necessary object classes, defining the attributes and their types, for example BookDescription, defined in the Book entry, are included. The BookDescription object class comprises two attributes: "title" of type string and "publisherId" of type integer.

From this textual description that directly derives from the X500 model, the mapping method extracts:
the SDN, direct textual representation of the SDIT,
the object classes contained in the entries,
and the attributes of said object classes/entries,
as illustrated by the XML listing of FIG. 9.

Five static DN are extracted, corresponding to the five vertices/entry comprising at least one variable RDN. It can be noticed that purely constant DN, that is entries only containing constant RDNs does give rise to a SDN. These static DN constitutes the SDIT.

Six object classes are extracted, corresponding to the object classes present in the initial tree.

Finally thirteen attributes are extracted from the initial definition. Attribute are distinguished by the object class they pertain. For instance the attribute "name" for "AuthorIdentity" is distinguished from the attribute "name" for "ClientIdentity". They are respectively denoted "AuthorIdentity.name" and "ClientIdentity.name". Each attribute is completed in addition to its name, by a type.

Since the RDB database does not pre exist, tables can be created during the mapping process. This is illustrated at FIG. 10 figuring the RDB managing order used to create the tables of the example. This is a straightforward operation that can be done automatically. Six tables are created, corresponding to the six object classes previously extracted. Each table is named after the object class name. It contains one column for each attribute identified in the object class extraction, that may be called "ordinary" columns, and also one column for each variable RDN in the entries/DN instantiating said object class, that may be called "special" columns. Each special column is also declared as being a primary key for the table.

For instance the "BookDescription" object class comprises attributes "title" and "publisherId". Two static DN, "AuthorId" and "ISBN" use the object class "BookDescription". The corresponding "BookDescription" table is then created with four columns: "AuthorId", "ISBN", "title" and "publisherId". "title" and "publisherId" are ordinary columns, while "AuthorId" and "ISBN" columns are special columns that are also declared as primary keys for that table.

After creating said tables, one last step is to capture and store the mapping address of the data. This is done during the mapping process by, for example, storing in each attribute the identifier of the table and the identifier of the column in which it appears. For instance the attribute "BookDescription.title" comprises two fields Table and Column respectively containing the name of the table "BookDescription" and the name of the column "title", respectively used in the RDB to store said attribute. These field values may be used to address the contents of said table in the RDB.

The structure of the RDB is then ready to welcome data. In other words database has to be populated. Some entry creations are applied as figured in the XML listing of FIG. 11. Two kind of order are used here "createEntry", that create an entry and "setAttribute" that define an attribute. For instance an entry BALZAC is created and its two attributes instantiated by the sequence of instructions:
    createEntry AuthorId=BALZAC,OU=Authors, OU=BookshopOnLine
    setAttribute AuthorId=BALZAC,
    OU=Authors,
    OU=BookshopOnLine name="Honoré de Balzac"
    setAttribute AuthorId=BALZAC,
    OU=Authors,OU=BookshopOnLine
      country="FRANCE".

After that the database may be used, for example interrogated. FIGS. 12 and 13 shows two samples of database requests. The first, as appearing in FIG. 12 is a simple request attempting to read an entry. It uses the instruction "readEntry" followed by a DN AuthorId=BALZAC, OU=Authors, OU=BookshopOnLine. The mapping application receiving said DN first derives the static DN, that is: AuthorId=, OU=Authors, OU=BookshopOnLinen by removing the variable value "BALZAC". Then said SDN is compared with static DNs (listing of FIG. 9) to match the first of them. It refers to the objet class "AuthorIdentity" which in turn refers to attributes "name" and "country". In the corresponding attribute descriptions
    Attribute="AuthorIdentity.name" Type="String(16)"
      Table="AuthorIdentity" Column="name"
    Attribute="AuthorIdentity.country" Type="String(16)"
      Table="AuthorIdentity" Column="country"

can be found the addresses, that is Table="AuthorIdentity" for both, and respectively Column="name" and Column="country". The mapping application can then build a RDB request, indicating to search the table "AuthorIdentity", trying to match the primary key given "AuthorId" with the given value of "BALZAC", and to retrieve in the matching row, the content of the columns "name" and "country". Such a RDB request would then provide the following result
    >AuthorId=BALZAC,OU=Authors,
OU=BookshopOnLine
    >name="Honoré de Balzac"
    >country="FRANCE"

The XML listing of FIG. 13 shows another example with a list request introduced by a wildcard "*".

The invention claimed is:

1. A method, in a computer system, for mapping an X500 data model comprising at least one entry (7), at least one object class, and a directory information tree, DIT (6), an entry (7) comprising at least one attribute (8), an attribute (8) comprising a type (9) and a value (10), said entry (7) gathering information about one object, an object class being a model defining the types of said attributes (8) present in the entry (7) that describes said object, the vertices in said DIT (6), being entries (7), each entry (7) comprising a distinguished name, DN, comprising the DN of said parent's entry in said DIT (6) together with a relative distinguished name, RDN, comprising one specially nominated attribute (8) proper to said entry (7), onto a relational database, RDB, comprising relational tables (11), each table (11) comprising several named columns (14), some of these columns being primary key, that is containing value that uniquely identify object data, where object data is stored in row (15), characterized in that it comprises the steps of:
    building object classes, each comprising a list of its attributes (8),
    building attributes (8), each comprising its type (9),
    building a static directory information tree, SDIT, comprising only static DN (SDN) that is DN comprising only static RDN, defined as RDN with any variable value removed,
    mapping X500 data to RDB by associating
      an X500 object class to a RDB table (11)
      an X500 attribute (8) to a RDB table column (14) and storing the name (13) of said table column (14) with said X500 attribute (8), as an address pointing to said attribute (8).

2. The method of claim 1, where the steps of building object classes, building attributes, and building a static directory information tree, are made by respectively extracting said elements from an X500 specification.

3. The method of claim 1, where the steps of building object classes, building attributes, and building a static directory information tree, are made by creating these elements out of an analysis of a RDB.

4. The method of claim 2, where the steps of building object classes, building attributes, and building a static directory information tree, are made by creating these elements out of an analysis of a RDB.

5. The method of claim 1, where an access/request to an entry (7), respectively an attribute (8) of an entry, of the X500 mapped RDB, defined by the DN of said entry (7), respectively by the DN of the entry of said attribute (8) together with said attribute (8), comprises the steps of:
    build a static DN, SDN, from said entry's DN, by removing any variable value out of said DN,
    fetch the static DIT, SDIT, to localize a matching static DN, extract from the attributes (8) of said matching static DN the mapping addresses of the table columns (14) corresponding to all of the attributes (8) of said entry (7), respectively to said attribute (8), build a RDB request containing said mapping addresses, execute the request, get the result of said request.

6. The method of claim 2, where an access/request to an entry (7), respectively an attribute (8) of an entry, of the X500 mapped RDB, defined by the DN of said entry (7), respectively by the DN of the entry of said attribute (8) together with said attribute (8), comprises the steps of:

build a static DN, SDN, from said entry's DN, by removing any variable value out of said DN, fetch the static DIT, SDIT, to localize a matching static DN, extract from the attributes (8) of said matching static DN the mapping addresses of the table columns (14) corresponding to all of the attributes (8) of said entry (7), respectively to said attribute (8), build a RDB request containing said mapping addresses, execute the request, get the result of said request.

7. The method of claim 3, where an access/request to an entry (7), respectively an attribute (8) of an entry, of the X500 mapped RDB, defined by the DN of said entry (7), respectively by the DN of the entry of said attribute (8) together with said attribute (8), comprises the steps of:

build a static DN, SDN, from said entry's DN, by removing any variable value out of said DN, fetch the static DIT, SDIT, to localize a matching static DN, extract from the attributes (8) of said matching static DN the mapping addresses of the table columns (14) corresponding to all of the attributes (8) of said entry (7), respectively to said attribute (8), build a RDB request containing said mapping addresses, execute the request, get the result of said request.

\* \* \* \* \*